United States Patent [19]
Nyman et al.

[11] 3,803,843
[45] Apr. 16, 1974

[54] HYDROMECHANICAL TRANSMISSION

[75] Inventors: Bengt E. Nyman, Redmond, Wash.; Larry T. Becker, Rockford, Ill.

[73] Assignee: Sundstrand Corporation, Rockford, Ill.

[22] Filed: Jan. 22, 1973

[21] Appl. No.: 325,918

Related U.S. Application Data
[62] Division of Ser. No. 171,925, Aug. 16, 1971, Pat. No. 3,733,931.

[52] U.S. Cl............................ 60/19, 60/431, 60/443, 60/449
[51] Int. Cl............................................ F02b 41/00
[58] Field of Search ....... 60/19, 327, 328, 431, 435, 60/439, 443, 445, 449

[56] References Cited
UNITED STATES PATENTS

| | | | |
|---|---|---|---|
| 2,994,233 | 8/1961 | Gerard................................ | 74/687 |
| 3,284,999 | 11/1966 | Lease................................ | 60/449 X |
| 3,371,479 | 3/1968 | Yapp et al. ............................ | 60/431 |
| 3,396,607 | 8/1968 | Ross.................................... | 74/687 |
| 3,442,153 | 5/1969 | Ross.................................... | 60/19 X |
| 3,455,184 | 7/1969 | Frandsen et al. ....................... | 74/687 |
| 3,583,154 | 6/1971 | Utter.................................. | 60/449 X |

Primary Examiner—Edgar W. Geoghegan
Attorney, Agent, or Firm—Hofgren, Wegner, Allen, Stellman & McCord

[57] ABSTRACT

An infinitely variable hydromechanical transmission for a highway truck or the like including a hydraulic pump and motor together with a mechanical differential, means for varying the displacement of one of the hydraulic units, a low range clutch for transmitting power directly from the hydraulic units to the output shaft in a purely hydrostatic mode, a high range clutch engageable synchronously under full load or establishing split power paths in a hydromechanical mode, and control means for actuating the clutches and the displacement varying means. The control system includes a governor valve for controlling the displacement varying means, an acceleration control for simultaneously establishing an engine throttle setting and a governor valve setting, a charge pump for supplying charge fluid under pressure, an engine speed sensing valve for receiving charge fluid and supplying pressure proportional to engine speed to actuate the governor valve in opposition to the manual bias for establishing a transmission ratio to control engine speed, a pressure regulating valve for receiving charge pressure and supplying control pressure to the governor responsive to a pressure signal from the engine speed responsive valve in a manner to establish maximum control pressure at approximately 70 percent of rated engine speed, a drive selector valve for establishing neutral, low range forward, reverse and high range forward, a shift valve for controlling energization of the high range clutch and deenergization of the low range clutch, a shift qualifying valve controlled by the engine speed responsive valve for supplying a signal to the shift valve indicating attainment of predetermined minimum engine speed, a synchronous speed sensitive valve for supplying a shift signal to the shift valve when the speed of the output shaft exceeds the speed of the input shaft, a sequence valve controlled by the shift valve for reversing the displacement varying means when shifting from low range to high range, a reshift delay valve for preventing immediate downshift from high range due to transitory signals, and shunt valve means for connecting opposite sides of the displacement varying means in event of panic stops.

25 Claims, 6 Drawing Figures

HYDROMECHANICAL TRANSMISSION

This is a division of application Ser. No. 171,925 filed Aug. 16, 1971, now U. S. Pat. No. 3,733,931, issued May 22, 1973.

BACKGROUND OF THE INVENTION

The present invention relates to improvements over the transmissions and controls of prior U.S. Pat. Nos. 3,396,607, 3,442,153 and 3,455,184, all relating to a hydromechanical transmission including a variable displacement pump, a motor, and a mechanical differential adapted for operation in a low range hydrostatic mode or a high range hydromechanical mode. A low range clutch is provided for locking the differential or connecting the motor directly to the output shaft for transmitting all power through the hydraulic units. A high range clutch is provided for transmitting some power mechanically through the differential while some power is transmitted through the hydraulic units. In order to bring the transmission up to speed, the low range clutch is engaged and the displacement of the variable hydraulic unit is varied to vary the transmission ratio. When the variable unit attains maximum displacement in a positive direction, the clutch elements of the high range clutch rotate substantially synchronously and in order to shift to the high range hydromechanical mode, the high range clutch is engaged under full load and the low range clutch is disengaged. At the same time, the fluid connections to the displacement varying means are reversed.

In the first mentioned patent, U.S. Pat. No. 3,396,607, the transmission was controlled by manually controlling the displacement varying means, and the clutches were controlled responsive to the position of the displacement varying means, for shifting from one range to the other.

In the second mentioned patent, U.S. Pat. No. 3,442,153, the displacement varying means was controlled by a governor valve adapted to receive a manual input command signal and respond to engine speed in a way to control the transmission ratio to maintain desired engine speed called for by an accelerator signal operable with the manual input to the governor valve. The clutches were controlled by a shift valve responsive to a pressure signal derived from the position of the displacement varying means, to shift from one range to the other. A forward-reverse valve enabled reverse operation.

In the third mentioned patent, U.S. Pat. No. 3,455,184, the transmission ratio was also controlled by a governor valve. An accelerator pedal simultaneously established an engine throttle setting and a governor valve setting, and the governor valve was responsive to engine speed for establishing a transmission ratio adapted to control engine speed. In the starting mode, the transmission was subject to a pressure control which limited acceleration. The clutches were controlled responsive to a minimum engine speed and synchronous output speed in a manner to energize the high range clutch, deenergize the low range clutch and reverse the displacement varying means. Such control included a shift valve responsive to predetermined engine speed and synchronous output speed, together with a sequence valve responsive to the shift valve for deenergizing the low range clutch after energization of the high range clutch. A drive selector valve included forward, neutral and reverse positions.

The present invention involves improvements in a system similar to that in the last mentioned U.S. Pat. No. 3,455,184 to provide refinements and sophistication suitable for commercial development in an arrangement where the controls are simple to operate and provide controlled acceleration and sensitive response under all conditions of operation.

SUMMARY OF THE INVENTION

According to the present invention, a transmission of the type described is provided, together with controls including a governor valve for controlling the displacement varying means, an acceleration control for establishing an engine throttle setting and simultaneously establishing a governor valve setting, a valve means responsive to engine speed for supplying a fluid pressure signal to the governor valve in opposition to the manual setting and proportional to the square of engine speed for controlling transmission ratio to regulate engine speed.

In the preferred control system illustrated herein, a pressure regulator valve receives charge fluid and supplies control fluid to the governor valve, and the pressure regulator valve is responsive to engine speed for establishing maximum control pressure at a predetermined engine speed less than maximum.

As shown, engine speed is sensed by a valve means controlled by rotary flyweights and adapted to deliver fluid pressure proportional to the square of engine speed to control the governor valve and the pressure regulator valve. After the pressure regulator valve is opened, a feedback signal is supplied to limit the maximum regulated pressure. After the speed sensor valve is opened, it provides a feedback signal for limiting valve opening movement to control maximum speed sensitive pressure. Charge fluid is supplied to the speed sensor valve and the pressure regulator valve by a charge pump, and charge pressure is controlled by a charge relief valve subject to a modulating signal from the governor valve for increasing the relief setting to increase the charge pressure as the control pressure increases In the variable displacement hydraulic unit, the displacement varying means is mounted subject to a stroke-reducing fluid pressure moment (in the pumping mode) which functions to limit working pressure without the use of high pressure relief valves which result in loss of power. Working pressure thus increases proportionally with increases in control pressure delivered to the displacement varying means by the governor valve.

In the governor valve, the initial manual signal applied by the accelerator control tends to supply a reverse signal to the displacement varying means prior to the time the engine attains sufficient speed to control the governor valve, and such initial manual signal is ported to drain through a slot on the piston rod in the displacement varying means, in order to be ineffective when the displacement varying means in near zero displacement.

The governor valve is adapted to control the transmission ratio in a manner to control engine speed, and it functions in such a manner during acceleration as well as deceleration. An acceleration control is provided for simultaneously actuating the governor valve and the engine throttle to bring the transmission up to speed, and a separate braking control is provided for actuating the governor valve without actuating the engine throttle during braking.

In the event of panic stops, where the fixed displacement hydraulic unit (acting as a motor) becomes locked as by mechanical brakes, shunt valve means responds to the pressure created by the displacement varying means tending to return to zero stroke, and connects opposite sides of the displacement varying means so that the resistance of the displacement varying means to return to zero stroke consists merely of the dynamics of the displacement varying piston, that is, resistance to movement in fluid.

A drive selector valve includes a neutral position preventing transmission operation, a reverse position enabling transmission operation reversely in the low range, a forward low position for obtaining forward operation in the low range while preventing shifting to the high range, and a forward high position where transmission operation begins in the low range and automatically shifts to the high range as necessary.

Shifting of the transmission from the low range to the high range is controlled by a shift valve which is adapted to be operated responsive to a signal which indicates that the engine has attained a predetermined minimum speed, and such signal is supplied to the shift valve by a shift qualifying valve which is responsive to the engine speed sensing valve.

Operation of the shift valve is also dependent upon a signal indicating substantially synchronous rotation of the high range clutch elements, and such signal is provided by valve means which provides a positive signal preventing operation of the shift valve when the input speed exceeds the output speed, and provides a negative signal permitting shift valve operation when the output speed exceeds the input speed.

After the transmission has shifted into the high range, it is desirable to prevent a situation where the manual acceleration signal may be entirely removed from the governor valve without applying a braking signal for the reason that an undesirable free wheeling effect follows. In order to prevent such a situation, the sequence valve supplies a predetermined minimum pressure setting on the governor valve after shifting to the high range.

Primarily, the shift valve provides a signal energizing the high range clutch. At the same time, the shift valve actuates a sequence valve which deenergizes the low range clutch and reverses the displacement varying means. The shift valve and the sequence valve are provided with reduced end portions which are pressurized by the sequence valve for holding each valve in actuated position.

Generally speaking, the transmission ought to respond freely for reshifting downwardly. However, in order to prevent an immediate reshift down to the low range due to transient signal, a reshift delay valve prevents downshift for a predetermined period after upshift in order to prevent spurious response.

BRIEF DESCRIPTION OF THE DRAWINGS

FIG. 4 is a graph with curves representing operation of the pressure regulator and the speed sensor; and FIG. 5 consisting of FIGS. 5A and 5B is a hydraulic circuit diagram illustrating a control system embodying the principles of the present invention.

DESCRIPTION OF THE PREFERRED EMBODIMENT

Figure 1:
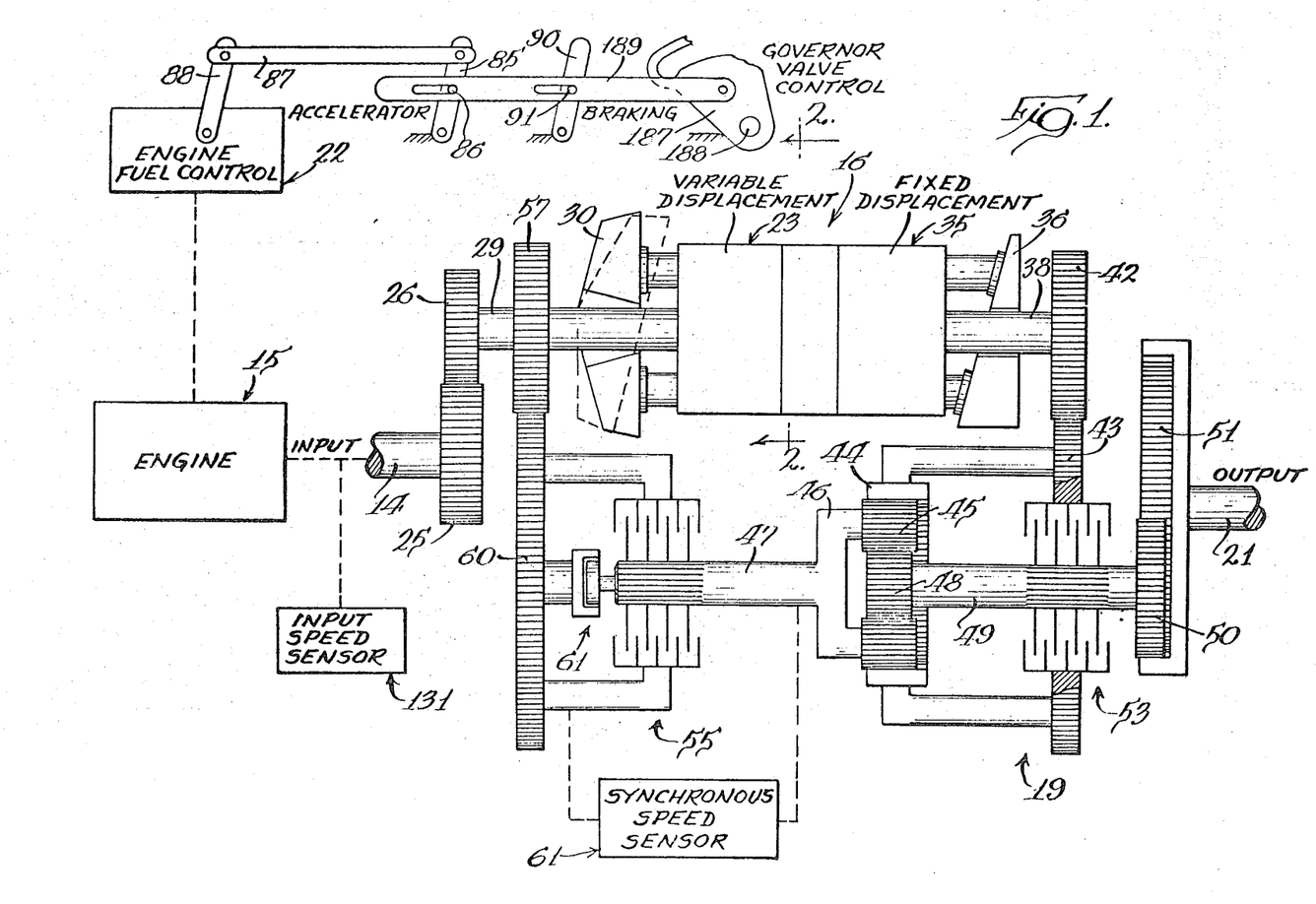
FIG. 1 is a diagrammatic illustration of a hydromechanical transmission adapted to be controlled by the improved control system embodying the principles of the present invention.

Referring to the drawings in more detail, and particularly FIG. 1, a hydromechanical transmission is illustrated, particularly adapted for use in highway vehicles where high efficiency and performance are required over a wide speed range, but also adapted for use in hard working, slow moving vehicles, sometimes referred to as off-highway equipment.

Transmission Configuration

The transmission includes an input shaft 14 driven by a suitable prime mover 15, a hydrostatic transmission 16, a mechanical gear differential 19, a pair of clutches 53 and 55, and an output shaft 21. The engine is adapted to be controlled by an appropriate fuel control device 22. While the disclosure includes a showing of a single hydrostatic transmission, it should be understood that the system may include one or more additional hydrostatic transmissions parallel to the transmission 16, between the input shaft 14 and the output shaft 21.

The input shaft 14 is drivingly connected to variable hydraulic unit 23 in the hydrostatic transmission 16 through gear 25 on input shaft 14 and gear 26 on shaft 29. The variable displacement unit 23 includes a variable angle swashplate 30 controlled by displacement control motor 33 (FIG. 5B) in the form of a piston and cylinder device. The transmission 16 also includes a fixed displacement unit 35 drivingly connected to shaft 38.

Each of the hydraulic units 23 and 35 is an axial piston unit of conventional configuration which is readily understood by those skilled in the art so that detailed description of the construction and operation is not believed necessary.

The variable displacement cam or swashplate 30 in the hydraulic unit 23 is movable from a zero displacement position transverse to the shaft 29 toward a first maximum displacement position on one side of the zero position and oppositely toward a second maximum displacement position on the other side of the zero position. Thus, reversible flow relative to the variable displacement hydraulic unit is provided by movement of the cam member in opposite directions from the zero position to reverse the flow in the conduits interconnecting the variable unit with the fixed unit 35. In this manner, the direction and speed of the fixed hydraulic unit may be controlled by the variable unit.

As will appear hereinafter, the hydraulic units are adapted to operate in both pumping and motoring modes depending upon the mode of the transmission.

Shaft 38 has a gear 42 fixed thereto drivingly engaging teeth on an external ring gear 43 fixed to an internal ring gear 44 in the mechanical differential 19. Engaging the internal ring gear 44 are a plurality of planetary pinions 45 rotatably mounted on a planetary carrier 46 fixed to a shaft 47. The planetary pinions 45 engage a sun gear 48 on a shaft 49 carrying a pinion 50 meshing with a gear 51 on the output shaft 21.

First clutch 53 is provided for selectively connecting ring gear 43 directly to the sun gear shaft 49 in the low speed range of the transmission so that the differential 19 may be effectively locked and the power from the input shaft 14 to the output shaft 21 will flow solely through the hydraulic transmission 16. Clutch 53 is actuated by hydraulic means represented diagrammatically at 54 in FIG. 5A.

Second clutch 55 is provided for selectively connecting the shaft 47 to be driven by input shaft 14. Toward this end, a gear 57 fixed to shaft 29 drivingly engages a large gear 60 carrying the driving elements of clutch 55. The clutch is adapted to be actuated by hydraulic means diagrammatically represented at 56 in FIG. 5A. When the clutch 55 is engaged and the clutch 53 is disengaged, the transmission is placed in a hydromechanical high speed mode where power is delivered from the input shaft 14 to the output shaft 21 through both the hydrostatic transmission 16 and the mechanical differential 19. As will appear, the transmission is automatically shifted from the low speed mode to the high speed mode by engaging the clutch 55 when the clutch elements are rotating synchronously. In order to determine when the clutch elements are rotating synchronously, a synchronous speed sensor 61 (FIG. 5A) is responsive to the speed of both clutch elements and provides a shift signal as explained in more detail below.

Before proceeding with a description of the operation and controls, it is important to note that the hydrostatic transmission makes use of the fluid pressure moment in the variable hydraulic unit 23 as a pressure limiting means in the hydraulic system. In particular, referring to FIG. 2, there is an illustration of a valve plate 62 associated with the rotatable cylinder block in the variable hydraulic unit 23 including arcuate inlet and outlet ports 63 and 64 adapted to communicate successively with cylinder ports 65 in the cylinder block of the variable hydraulic unit 23, as the cylinder block rotates. The variable swashplate 30 in the variable unit is mounted for pivotal adjustment by means of trunnions represented at 65 defining a pivot axis 66.

Figure 2:
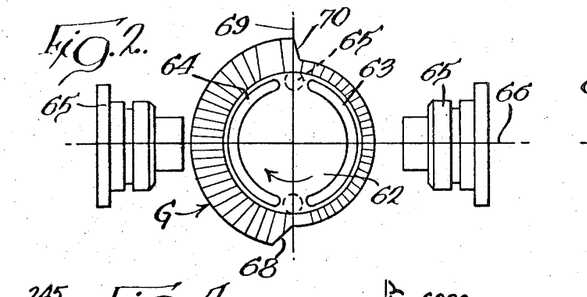
FIG. 2 is a diagrammatic cross sectional view through the variable displacement hydrauic unit in the transmission of FIG. 1, taken at about line 2—2 of FIG. 1, showing the relationship of the arcuate valving in the unit to the pressure pattern developed adjacent the valving, and the relationship of the pressure pattern to the pivot axis for the swashplate.

With the swashplate 30 pivoted toward the broken line position of FIG. 1, and the cylinder block in the variable unit rotating in the direction of the arrow in FIG. 2, and functioning as a pump, as one of the cylinder ports 65 approaches the outlet port 64, and the associated piston is exposed to outlet port pressure and begins the pumping stroke, a pressure pattern is developed somewhat as represented by Graph G. At the beginning of the piston pumping stroke, the pressure does not begin to rise until the piston reaches bottom dead center, as shown at the inclined pressure gradient line 68. In contrast, when the piston reaches the end of the pumping stroke near the piston dead center plane 69, the pressure does not begin to decrease until the piston has reached top dead center, as represented by the pressure gradient line 70.

Figure 3:
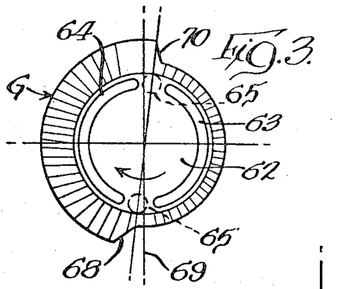
FIG. 3 is a view similar to FIG. 2, showing indexed porting for controlling system pressure.

As a result of the somewhat delayed pressure increase and the somewhat delayed pressure decrease, the pressure pattern, or the force of pressure fluid acting on the swashplate, is greater above the swashplate pivot axis than below, and there is a stroke reducing tendency which has the effect of urging the swashplate out of stroke back toward the no-stroke position. It will be appreciated that the fluid pressure moment may be varied or controlled by indexing the porting relative to the piston dead center plane 69 and the pivot axis 66. In particular, if the arcuate porting is indexed in the direction of cylinder block rotation as shown in FIG. 3, it will have the effect of increasing the stroke-reducing effect of the fluid pressure moment. Note that pressure buildup cannot begin until communication with the low pressure inlet port 63 is discontinued, whereas high pressure continues at the end of the pump stroke until communication with port 64 is discontinued. In this manner, the maximum pressure developed by the hydraulic unit may be controlled by increasing the stroke-reducing moment to a place where a predetermined working pressure will have the effect of reducing the stroke of the hydraulic unit, and therefore reducing working pressure. In the preferred construction illustrated, the arcuate porting is indexed about 6° in the direction of cylinder block rotation as illustrated in FIG. 3.

Use is made of the stroke-reducing function of the fluid pressure moment in the control of the transmission as will appear in more detail hereinafter. In general, the working pressure control described is utilized as a torque control or acceleration control during initial phases of bringing the vehicle up to speed so as to limit the rate of change of acceleration. The working pressure feedback is also utilized as a pressure limiting control in the cruising range of the transmission. It has the advantage of limiting pressure without dissipating power, and it ensures that there will not be any creep at neutral, for the reason that if the transmission control is in neutral and the swashplate is not at zero stroke, pumping of any fluid will have a stroke-reducing effect on the swashplate.

A control system is provided for the transmission and the prime mover engine so that the speed of the associated vehicle may be varied as desired. Manual controls in the system include an acceleration and braking control 75 (FIG. 5B) adapted to control the transmission setting. A direction control 77 is provided for selecting neutral, forward, low or reverse operation. A power take-off (PTO) control 78 normally allows transmission operation and may be actuated for purposes of preventing transmission operation when a power takeoff shaft (not shown) is utilized for operating auxiliary equipment while the vehicle is standing.

The acceleration and braking control 75 is movable from an inactive position shown to bias a main transmission governor 80 for controlling the speed of the transmission through the medium of the control circuit illustrated in FIG. 5.

Figures 4, 5A:
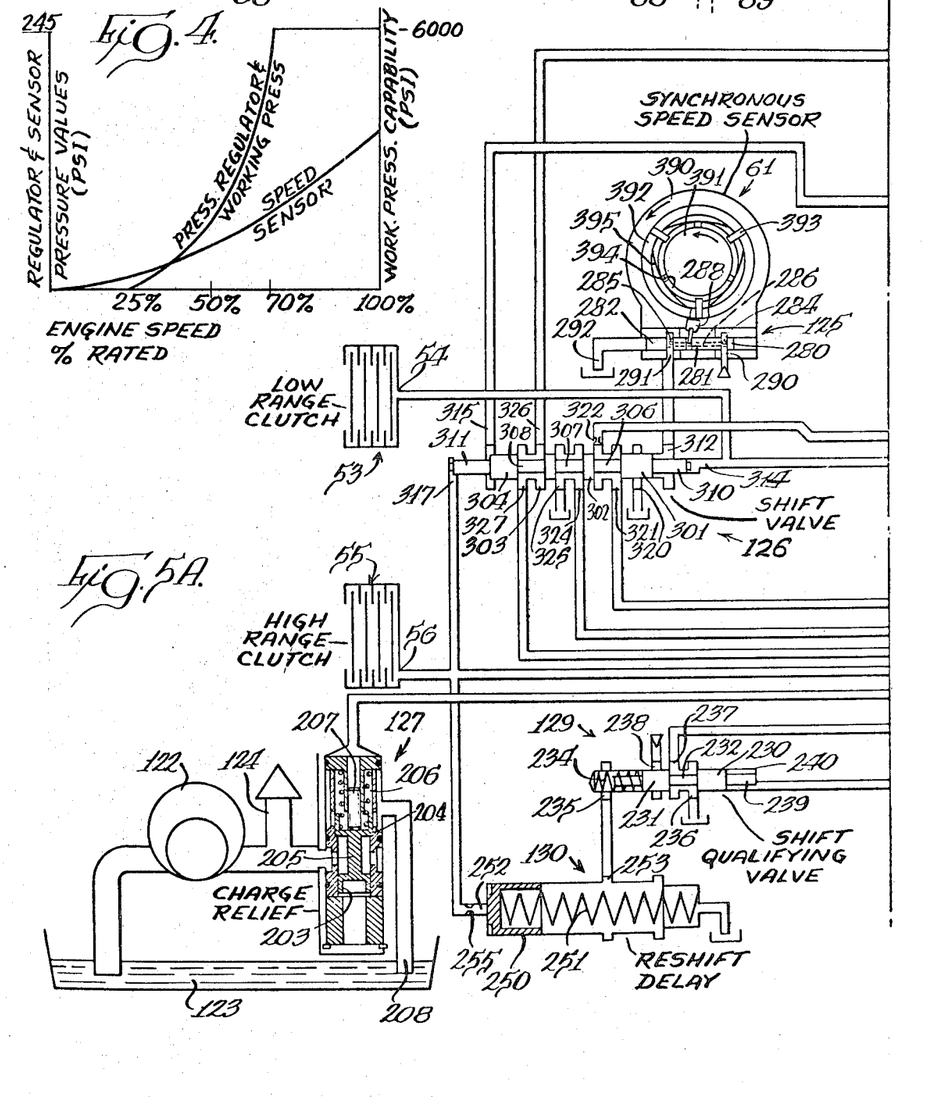
Figure 5B:
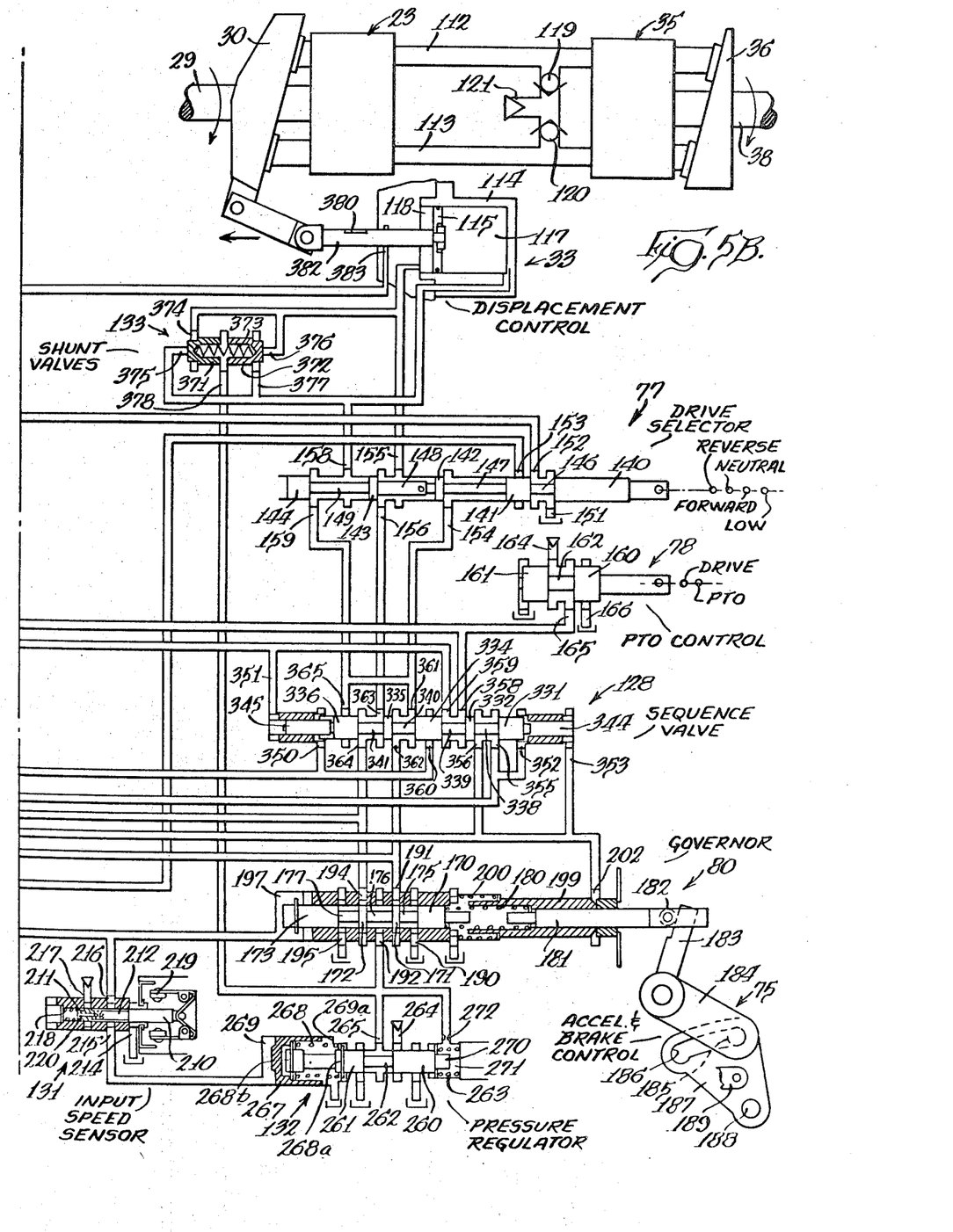

In operation, when the prime mover engine 15 is running and the drive selector 77 is in the forward drive position for attaining high speed, and the operator increases the governor valve setting by means of the acceleration control 75, and simultaneously increases the engine throttle setting above engine idle range, the governor control 80, after an increase in engine speed, through the medium of the control circuit of FIGS. 5A and 5B, begins increasing the displacement of the variable displacement hydraulic unit 23, which then acts as a pump supplying fluid to the hydraulic unit 35, then acting as a motor.

At this time, the hydrostatic or low range clutch 53 is engaged due to pressurization at 54, locking the differential 19, and the hydromechanical clutch 55 is disengaged. The engine speed then increases to a value dictated by the acceleration control 75. The transmission is then in a low speed hydrostatic mode where the hydraulic unit 23 acting as a pump drives the unit 35 in the same direction of rotation. Motor 35 drives the output shaft 21 through the gear 42 and the differential 19, applying a load to the pump which in turn loads the engine to maintain the engine speed at the value selected.

The governor control 80 in conjunction with the control circuit of FIG. 5 controls the transmission ratio in a manner to maintain the selected engine speed so that if the engine speed is below that called for by the governor control, the transmission ratio (output speed divided by input speed) will be reduced (output speed reduced relative to input speed) to let the engine gain speed. If the engine speed is above that called for by the governor control, the ratio will be increased to apply additional load to the engine. In this manner, the power of the output shaft 21 is controlled by the displacement of the hydraulic unit 23 and the speed of the engine without varying the ratio in the mechanical differential.

The transmission remains in the low range straight hydrostatic mode until the output speed (represented at shaft 47) equals or slightly exceeds the input speed (represented at gear 60), which occurs as the variable displacement unit 23 attains maximum stroke. When the output speed equals or slightly exceeds the input speed, at approximately one-half of rated engine speed, the control circuit of FIG. 5 pressurizes the high range clutch 55 at 56 for hydromechanical transmission operation and depressurizes the low range clutch 53 at 54, engaging clutch 55 and disengaging clutch 53. Engaging the clutch 55 connects the input shaft 14 to drive the differential carrier shaft 47, and disengaging the clutch 53 unlocks the ring gear 43 from the sun gear shaft 49 to allow differential action. The gearing in the differential is selected so that when the variable displacement unit 23 is near full stroke, with clutch 53 engaged and clutch 55 disengaged, the gear 60 and the shaft 47 will rotate at substantially the same speed so as to allow synchronous clutching, providing a smooth shift under power from the straight hydrostatic mode to the split hydromechanical mode.

After the shift to the high range, and for about the first half of the hydromechanical mode, if the engine speed still tends to increase above the desired level established by the acceleration control, the control circuit will cause a reduction in the displacement of the hydraulic unit 23 which then begins to act as a motor or metering device for the fixed displacement unit 35, which then acts as a pump driven by gear 42.

With the clutch 55 engaged and the clutch 53 disengaged, the gear carrier 46 and the ring gear 44 rotate in the same direction so that the ring gear effectively subtracts speed from the differential as compared to the output speed when the ring gear is stationary. This occurs in the first part of the hydromechanical mode. As the displacement of the hydraulic unit 23 is further reduced toward zero displacement, it provides a greater restriction to flow, and the speed of the fixed hydraulic unit 35 decreases thereby subtracting less and less speed from the differential 19, permitting the speed of the output shaft 21 to increase further. During this mode, the speed of the hydraulic unit 35 and the stroke of the variable unit 23 decrease toward zero.

During the second half of the hydromechanical mode, in response to a continuing tendency of the engine speed to increase above that dictated by the accelerator control setting, the control circuit will cause the variable unit cam 30 to reach zero displacement and then continue overcenter, so that the fixed displacement unit 35 will cease rotation as the variable unit 23 passes through zero displacement, thereby stopping rotation of the ring gear 43. The variable unit 23 then acts as a pump with the cam 30 on the opposite side of neutral driving unit 35 again as a motor but in a reverse direction. This causes ring gear 43 to reverse its direction of rotation so that it begins rotation opposite from the planet carrier 46 thereby adding speed to the differential and further increasing the speed of the output shaft 21. The speed of the transmission can then be increased in this mode until the maximum speed is attained when the displacement of the hydraulic unit 23 is at maximum in the negative direction.

In bringing the output shaft 21 up to speed, the stroke of the hydraulic unit 23 is thus effectively used three times as it goes to full stroke, back to zero stroke, and then to full stroke in the opposite direction, while the output shaft reaches full speed.

After the engine attains the speed dictated by the acceleration control, the governor 80 and the control circuit will assume an equilibrium position. If desired, the speed of the vehicle may then be decreased by shifting the acceleration control back toward its inactive position. The reduced accelerator setting will cause the transmission to temporarily load the engine and thereby effect a decrease in engine speed. That is, the recessed accelerator control setting causes the governor and the control circuit to increase system pressure by movement of the cam 30 toward zero stroke, resulting in an increase in load on the engine by the transmission, driving the engine speed down to the new lower level. As the engine speed falls slightly below the new value, the governor and the control circuit will begin reducing the transmission ratio by reducing the displacement of the hydraulic unit 23 from the negative position toward zero stroke, thus reducing transmission ratio in the upper portion of the hydromechanical mode, and then again increase displacement on the positive side of zero stroke position, if necessary.

If the load imposed on the engine by the transmission is still greater than that required to maintain engine speed at the reduced level, the governor and the transmission control will place the hydraulic unit 23 approximately in maximum positive displacement and the output speed will fall to or below the input speed, and in response to this, the low range clutch 53 will be engaged and the high range clutch 55 disengaged, placing the transmission again in the straight hydrostatic mode. At the same time, the displacement cam 30 is reversed, moving again toward zero stroke as required to remove the load from the engine to maintain the desired engine speed.

In order to operate the transmission in the low speed mode only, the drive selector 77 is moved to a position for low range operation only, when the shift to hydromechanical operation cannot occur and the transmission is operated solely in the low speed hydrostatic mode.

Reverse drive of the transmission is effected by moving the drive selector 77 to the reverse position causing the transmission, under the influence of the governor 80, to move the cam member 30 toward maximum reverse position in the straight hydrostatic mode. Like forward operation in the low range mode, this permits about 20 per cent of the maximum transmission speed to be obtained in reverse. No reversing gears or clutch actuations are necessary to place the transmission in reverse, as it operates in the straight hydrostatic mode in the same manner as for the low speed forward hydrostatic mode, simply with the variable cam 30 inclined in the opposite direction.

Control System

In the control circuit of FIGS. 5A and 5B, the hydrostatic transmission 16 (FIG. 5B) includes the variable displacement axial piston hydraulic unit 23, with variable cam 30, and the fixed displacement axial piston hydraulic unit 35, with the fixed cam 36 connected in closed hydraulic circuit by means of conduits 112 and 113 adapted to function as connections leading from the outlet of the hydraulic unit acting as a pump to the inlet of the unit acting as a motor, and returning from the motor outlet to the pump inlet. The variable cam 30 is movable in opposite directions from the zero displacement position illustrated in full lines in FIG. 1 under control of the piston and cylinder device 33 including a cylinder 114 with a reciprocable piston 115 subject to fluid pressure in opposed chambers 117 and 118 at opposite ends of the cylinder.

The closed hydraulic circuit interconnecting the hydraulic units 23 and 35 operates under varying conditions in which the conduit 112 is sometimes the high pressure conduit and the conduit 113 the low pressure conduit, while at other times the conduit 113 is at high pressure and the conduit 112 at low pressure. In order to admit charge fluid to the circuit under either condition of operation, for purposes of makeup of leakage, inlet check valves 119 and 120 communicate respectively with the conduits 112 and 113, and with a charge fluid passage 121.

Charge fluid is supplied to the passage 121 by means of a charge pump 112 (FIG. 5A) which as illustrated draws fluid from a reservoir 123 and delivers charge fluid to a passage 124 which communicates with a number of charge fluid supply points in the circuit designated by triangular arrows. Normally, the charge pump draws fluid through a suitable cooler and filter which have been omitted to simplify the disclosure. In order to control the charge pressure, a charge relief valve is utilized at 127 for relieving excess pressure back to the reservoir 123. As will appear, the charge relief valve 127 is subject to modulation by control pressure in the circuit supplied by the governor 80 to increase the charge relief valve setting as the control pressure and system pressure increase.

With reference to the control piston 115 for the variable unit 23, the transmission operation is initiated by pressurizing the chamber 117 to move the variable unit cam 30 toward full stroke in a positive direction as illustrated in FIG. 5B. At the shift in mode from hydrostatic to hydromechanical, the chamber 118 is pressurized to move the variable angle cam back toward zero stroke and then toward the maximal angle in the opposite negative direction. In order to control operation of the displacement varying piston 115, as well as the clutches 53 and 55, to thereby control operation of the hydrostatic transmission and mechanical differential, the control circuit includes a number of manually actuated valves and a number of automatically operated valves. The three manually controlled valves have been previously identified, and include the drive and direction selector valve 77, the PTO control valve 78, and the governor valve 80. The automatically operated valves include a synchronous speed sensor valve 125 operated by the synchronous speed sensor 61, shift valve 126 operated by fluid pressure, sequence valve 128 operated by fluid pressure, shift qualifying valve 129 operated by fluid pressure, reshift delay valve 130 operated by fluid pressure, input speed sensor 131 driven by the input shaft, pressure regulator valve 132 operated by fluid pressure, and shunt valves 133 operated by fluid pressure.

Considering first and manually controlled valves, the drive and direction selector valve 77 (FIG. 5B) is adapted for selection of reverse, neutral, forward drive (low range and then high range) and forward low. The valve includes a valve stem having enlarged land portions 140, 141, 142, 143 and 144 with reduced stem portions 146, 147, 148 and 149 disposed between the enlarged portions. As illustrated in FIG. 5B, the direction selector valve stem is positioned to select forward transmission in the low range only, where shift to the high range is prevented. In the position illustrated, the reduced stem portion 146 communicates with a tank port 151 and a control port 152 leading to the shift valve 126, while the land 141 blocks a control port 153 leading to shift qualifying valve 129, the reduced stem portion 147 communicates with a control port 154 leading to sequence valve 128, the reduced stem portion 148 communicates with control port 155 leading to displacement varying chamber 118 and with port 156 leading to sequence valve 128, and reduced stem portion 149 communicates with port 158 leading to displacement varying chamber 117 and port 159 leading to sequence valve 128.

The power takeoff control valve 78 (FIG. 5B) includes a valve stem having spaced enlarged land portions 160 and 161 with a reduced stem portion 162 therebetween. When the valve stem is positioned as illustrated in FIG. 5 for permitting transmission operation, the reduced valve stem portion 162 communicates a charge pressure supply port 164 with a port 165 leading to the sequence valve 128 and to the shift valve 126. At the same time, the land portion 160 blocks communication with a tank port 166. When it is desired to utilize the vehicle engine power for operation of auxiliary equipment when the vehicle is standing, the power takeoff control valve may be moved toward the right to block the charge port 164 and communicate the port 165 with drain 166 in a manner to prevent energization of the clutches for transmission operation.

Referring to the governor valve 80 (FIG. 5B), it includes a valve stem which has spaced enlarged land portions 170, 171, 172 and 173 separated by reduced stem portions 175, 176 and 177. The valve stem is normally biased toward the left by a spring 180 bearing against the enlarged stem portion 170 and bearing against a manually controlled plunger 181 projecting outwardly from the valve housing and having means such as cam follower roller 182 adapted to be actuated by the acceleration and brake control 75. As illustrated, the acceleration and brake control includes a pivoted cam lever having an end portion 183 engaging the roller 182 and an opposite end portion 184 with a pin 185. The pin 185 is received in a cam slot 186 in a pivoted lever 187 adapted to be actuated in a clockwise direction about a shaft 188 by a link 189. The cam slot 186 is eccentric to the pivot axis so that pivotal movement of the lever 187 effects counterclockwise pivotal movement of the valve actuator arm 183.

In order to bring the transmission up to speed, the acceleration and braking control 75 is adapted to be actuated by an accelerator pedal which simultaneously increases the engine fuel throttle setting. The accelerator pedal (not shown) actuates a pivoted lever 85 having a pin-in-slot connection 86 with link 189. Lever 85 is connected by link 87 with a fuel control lever 88. On clockwise movement of levers 85 and 88, engine fuel is increased and the setting on the governor valve is increased.

In order to reduce the transmission output, the control 75 may be actuated by a brake pedal while permitting the engine throttle setting to be reduced. The brake pedal (not shown) actuates a pivot lever 90 having a pin-in-slot connection 91 with link 189. On clockwise pivoting of lever 90, link 189 is actuated while pin-in-slot connection 86 transmits no motion to the fuel control.

In the unactuated position of the governor valve stem as illustrated in FIG. 5B, the reduced stem portion 175 communicates with a tank port 190, the enlarged land portion 171 blocks a control port 191 leading to the sequence valve 128 and to the charge relief valve 127, the reduced stem portion 176 communicates with a port 192 leading to the pressure regulator 132 and to the shunt valves 133, the land 172 blocks a port 194 leading to sequence valve 128, and the reduced stem portion 177 communicates with a tank port 195.

The left end of the governor valve stem enlarged portion 173 is received in a chamber 197 adapted to be supplied with fluid under pressure from the input speed sensor valve 131 which functions to supply a pressure signal proportional to engine speed in a manner to move the governor valve stem in opposition to the manually compressible spring means 180.

The manual governor valve plunger 181 is slidable in a sleeve 199 against which the spring means 180 is normally seated. The sleeve 199 is biased toward the right as viewed in FIG. 5B by a spring 200 so that in the low range operation of the transmission, the pressure signal applied to the right end of the governor valve stem is solely that transmitted through the spring 180 by movement of the manual plunger 181. During operation of the transmission in the high range, it is undesirable to allow the manual input signal at 181 to be entirely removed to permit a free-wheeling effect. In order to prevent such operation, the sleeve 199 is subjected to a fluid pressure bias in a port 202 during operation in the high speed range so that the sleeve 199 is moved to the left against the bias of spring 200, to compress the spring 180 and ensure a predetermined bias on the governor valve even if the manual signal is removed at 181.

Considering now the automatically controlled valves in the circuit, the charge relief valve 172 (FIG. 5A) includes a valve stem with enlarged ends 203 and 204, the latter of which is larger, with a reduced stem portion 205 therebetween communicating with the charge pump 122. The valve member is urged toward the closed position illustrated by a spring 206 and is additionally urged toward the closed position by a control piston 207 at the time the governor valve delivers control pressure to the variable unit 23 to put the transmission in operation. In operation, as the charge pressure increases, it acts upon the enlarged end 204 of the relief valve member and in the event of excess pressure, the valve member is raised to the position communicating the charge pump with a return port 208, which relieves charge pressure to the tank 123.

The input speed sensor valve 131 (FIG. 5B) includes a valve stem which has enlarged portions 210 and 211 at opposite ends with a reduced stem portion 212 therebetween. When the valve stem is positioned as illustrated in FIG. 5B, the enlarged portion 210 blocks a drain port 214, the reduced stem portion 212 communicates with a port 215 leading to the pressure regulator 132 and a port 216 leading to the shift qualifying valve 129 and the governor valve 80. At the same time, the enlarged stem portion 211 blocks a charge pressure port 217. The valve stem in the input speed sensor is biased toward the right as viewed in FIG. 5B by a spring means 218 and is adapted to be moved against the bias of the spring means by engine speed responsive flyweight means 219 adapted to rotate with the input shaft and adapted to pivot outwardly responsive to speed for purposes of urging the valve stem toward the left to a position communicating the charge port 217 with the ports 215 and 216 to deliver fluid under pressure proportional to the square of the engine speed. Preferably, the reduced stem portion 212 has a radial port communicating with a longitudinal passage 220 which provides a feedback signal to the left end of the valve stem, to provide an appropriate limit on pressure in the port 216 proportional to engine speed.

The shift qualifying valve 129 (FIG. 5A) includes a valve stem having spaced enlarged land portions 230 and 231 with a reduced stem portion 232 therebetween. The valve stem is biased toward the right by a spring means 234 in a fluid chamber having a fluid supply port 235. When the valve stem is positioned as illustrated in FIG. 5A, the reduced stem portion 232 communicates a drain port 236 with a port 237 leading to the direction selector valve 77. At the same time, the enlarged land portion 231 blocks a charge pressure supply port 238. The right end of the valve member has a reduced stem portion 239 in a fluid chamber 240 communicating with the input speed sensor valve 131. When fluid under pressure is supplied to the chamber 240 by the input speed sensor valve 131, the shift qualifying valve member is movable to the left where the reduced stem portion 232 communicates the charge port 238 and the port 237 to supply fluid under pressure for shifting from the low range to the high range, at about one-half of rated engine speed.

The reshift delay valve 130 (FIG. 5A) includes a hollow piston-shaped valve member 250 which is biased toward the left in FIG. 5A by a spring 251 to a place where an inlet port 252 is out of communication with a control port 253 leading to the shift qualifying valve port 235. The port 252 is supplied with fluid through a restrictive orifice 255 which gradually allows pressure to build up in the port 252 sufficiently to shift the valve member 250 slowly toward the right to a place where the port 252 communicates with port 253. The reshift delay valve is effective, after shifting of the transmission into the high speed range, to delay for a limited period any shifting downwardly into the low speed range.

The pressure regulator valve 132 (FIG. 5B) includes a valve stem with enlarged space stem portions 260 and 261 with a reduced stem portion 262 therebetween. The valve stem is urged toward the left by spring means 263 to the position illustrated where the enlarged stem portion 260 blocks a charge pressure port 264 and the reduced stem portion 262 communicates with a port 265 leading to the governor valve 80 and the shunt valves 133. The left end of the pressure regulator valve stem is positioned in a hollow piston 267 which is biased outwardly on the stem by a spring 268. The spring acts between the snap ring 268a on the land 261 and a snap ring 268b near the end of the stem. The piston 267 is slidable in a chamber 269 communicating with the input speed sensor valve port 215.

The pressure regulator valve is controlled by the input speed sensor to supply regulated pressure to the governor 80. The construction of the pressure regulator valve is such that at engine idle speed, the pressure in the port 265 is zero. When the input speed sensor valve supplies fluid under pressure to the chamber 269, such pressure begins to overpower the spring 263 at about 25 per cent of rated engine speed, and the pressure regulator valve stem moves toward the right to communicate the charge pressure supply port 264 with the regulated pressure port 265. The piston 267 acts on the valve stem through spring 268 and ultimately abuts a stop 269a when the spring 268 will determine the maximum force setting on the valve stem, such that the regulated output pressure at the port 265 attains a maximum value at an appropriate engine speed less than maximum. The right end of the pressure regulator valve stem includes a reduced portion 270 in a spring chamber 171 which has a restricted inlet port 272 supplying a feedback signal from the regulated pressure port 265, to provide an appropriate limit on the regulated pressure.

The synchronous speed sensor valve 125 (FIG. 5A) includes a valve stem having enlarged stem portions 280, 281 and 282 with reduced portions 284 and 285 therebetween. The valve stem additionally includes a central longitudinal passage 286 communicating the reduced portions 284 and 285. The synchronous speed sensor 61 includes a valve actuator 288 engaging the valve stem portion 281 and adapted to shift the valve stem toward the left to the position illustrated in FIG. 5A while the input speed to the transmission exceeds the output speed. When the valve stem is positioned as illustrated, the reduced stem portion 284 communicates with a charge pressure supply port 290 and the reduced stem portion 285 communicates with a port 291 leading to the shift valve 126, so that charge pressure is supplied through the longitudinal stem passage 286 to the shift valve.

When the output speed increases to a place where it equals the input speed, the synchronous speed sensor shifts the valve stem toward the right where the charge pressure port 290 is blocked and the port 291 leading from the shift valve is communicated with a drain port 292. In this manner, the synchronous speed sensor and the associated valve 125 are constructed to provide a positive charge pressure signal to the shift valve 126 in the low range operation where the output speed is less than the input speed. Then, when the output speed exceeds the input speed, a negative signal is provided to the shift valve. The negative signal comprises a fail-safe feature which ensures that there will not be a downshift in event of loss of the shift signal due, for example, to line breakage, gasket failure, and the like.

The shift valve 126 (FIG. 5A) includes a valve stem having spaced enlarged land portions 301, 302, 303 and 304 with reduced stem portions 306, 307 and 308 therebetween. Outwardly of the enlarged stem portions 301 and 304, there are reduced end portions 310 and 311. The valve stem is adapted to be moved toward the left to the position illustrated in FIG. 5A by application of fluid under pressure to the right end of the enlarged portion 301 through a port 312 communicating with the port 291 in the synchronous speed sensor valve. At the same time, fluid is also supplied to the right end of the reduced stem portion 310 through a port 314. In the absence of a shift signal calling for valve movement rightward, fluid applied to the reduced stem portion 310 is sufficient to hold the valve stem in the actuated position even though fluid pressure may be withdrawn from the enlarged portion 301.

The shift valve stem is adapted to be moved toward the right by application of fluid under pressure against the left end of the enlarged stem portion 304 through a port 315 from the direction selector valve 77. The valve stem is adapted to be held in the rightmost position by application of fluid under pressure to the left end of the reduced stem portion 311 through a port 317 communicating with sequence valve 128.

When the shift valve stem is positioned as shown, enlarged stem portion 301 blocks a drain port 320, reduced stem portion 306 communicates a port 321 from the sequence valve with a port 322 from the PTO control valve 78, reduced stem portion 307 communicates a port 324 from the sequence valve with a drain port 325, and reduced stem portion 308 communicates a port 326 from the displacement varying means with a port 327 from the governor valve 80.

The sequence valve 128 (FIG. 5B) includes a valve stem which has enlarged land portions 331, 332, 334, 335 and 336, with reduced stem portions 338, 339, 340 and 341 therebetween. Outwardly of the enlarged stem portions 331 and 336, the valve stem includes reduced end portions 344 and 345. The sequence valve stem is adapted to be moved toward the right to the position illustrated in FIG. 5B by application of fluid under pressure to the left end of the enlarged stem portion 336 through a port 350 communicating with the shift valve 126, and the valve stem is adapted to be held in the shifted position by application of fluid against the left end of the reduced stem portion 345 through a port 351. The valve stem may be shifted to the left by application of fluid against the right end of the enlarged stem portion 331 through a port 352 communicating with the shift valve 126, and the valve stem may be held in the leftmost position by application of fluid to the right end of reduced stem portion 344 through a port 353.

In the rightmost position of the sequence valve stem, reduced stem portion 338 communicates a port 355 leading to the shift valve and a port 356 leading to the clutch 55, reduced stem portion 339 communicates a port 358 leading to PTO control valve 78 and a port 359 leading to shift valve 126. At the same time, the enlarged stem portion 334 blocks a port 360 leading to the shift valve 126, reduced stem portion 340 communicates a port 361 leading to the direction selector valve 77 and a port 362 leading to the governor valve 80, reduced stem portion 341 communicates port 363 leading to the direction selector valve and a port 364 leading to the governor valve 80, and enlarged land 336 blocks a port 365 leading to direction selector valve 77.

In operation of the synchronous speed sensor valve 125, the shift valve 126 and the sequence valve 128, the synchronous speed sensor provides a signal when the output speed equals the input speed so that the clutch 55 may be synchronously engaged. The synchronous speed sensor 61 operates the valve 125 to relieve the pressure from the right end of the shift valve 126 so that the latter may move to the right. Movement of the shift valve stem to the right pressurizes the clutch 55 and also pressurizes the sequence valve 128 to move the latter to the left where it depressurizes the clutch 53.

The shunt valves 133 (FIG. 5B) include a pair of similar valve members 371 and 372 of hollow configuration with a valve closing spring 373 in the hollow interiors of the valve members urging both valve members to the seated positions illustrated, where the valve member 371 blocks communication between a port 374 leading to displacement varying chamber 118 and a port 375 leading to displacement varying chamber 117, and the valve member 372 blocks communication between a port 376 leading to displacement varying chamber 118 and a port 377 leading to displacement varying chamber 117. The valve members 371 and 372 during transmission operation are also pressure-biased to the valve closed positions by regulated pressure in a port 378 communicating with the regulator pressure port 265 in the pressure regulator valve 132. Under panic stopping conditions, as when the vehicle wheels are locked by mechanical brakes at low speeds, the variable displacement cam 30 must move extremely fast to keep the engine unloaded. When this condition is sensed, the pressure created by the moving displacement varying piston 115, responsive to the stroke-reducing moment acting on cam 30, functions to force one or the other of the valve members 371 and 372, depending upon the direction of piston movement, into a valve open position where the two displacement varying chambers 117 and 118 are connected together through the shunt valve, so that the working pressure buildup will be limited to the dynamics of the piston 115, that is, the resistance of the piston to movement in fluid.

As will appear in description of the operation, the initial signal of the governor valve to the displacement varying piston and cylinder device 33 tends to be momentarily in the wrong direction. In order to prevent response to such signal, it is ported to drain through a longitudinal groove 380 on the piston rod 382 extending from displacement varying piston 115. When the piston is in the neutral central position, the longitudinal groove 380 communicates with the case and with a port 383 which communicates through the shift valve 126 with port 194 in the governor valve 80. Thus, even though initial manual operation of the governor valve tends to port pressure fluid to the displacement varying chamber 118, rather than 117, the signal is nullified through the drain connection at 380.

Operation

When the drive and direction selector valve 77 is in neutral position, the valve stem is to the left of the position shown in FIG. 5B of the drawings, where the land 143 would be disposed to the left of the port 158 and the land 142 would be disposed to the right of the port 155. Thus, the port 155 leading to one side of the displacement varying means and the port 158 leading to the other side of the displacement varying means are connected together through the reduced valve stem portion 148 so that the variable displacement swashplate 30 is maintained in a central neutral zero displacement position and the transmission is not in operation.

Under such conditions, even if the engine accelerator is operated to increase engine speed, and the governor valve 80 is operated, pressure still cannot be developed in a way to put the hydrostatic transmission into stroke. In particular, on initial governor operation, when the governor valve stem is moved toward the left from the position illustrated in FIG. 5B, before engine speed develops, any pressure delivered through the braking port 194 of the governor valve is ported to drain through the slot 380 on the piston rod 382 in the displacement varying means. As the engine develops speed, the governor valve stem is returned toward the right against the bias of the manually applied spring pressure. At this time, any fluid under pressure ported through the control port 191 in the governor valve is passed through the sequence valve across the reduced stem portion 340 to the port 361. From the port 361, the fluid passes to the right end of valve land 142 in the selector valve 77 and the left end of land 143 in the valve 77 and both lands block the flow of such fluid to the displacement varying chambers 117 and 118. Thus, even though the clutch 53 for obtaining low range hydrostatic transmission operation may be energized, the transmission cannot be put into operation with the valve 77 in neutral for the reason that no pressure can reach the displacement varying means to put the variable hydraluic unit 23 into stroke.

The drive and direction selector valve 77 may be positioned as illustrated in FIG. 5B for purposes of obtaining transmission operation forwardly in the low range only, in a manner to block shifting into the high range. In operation, with the valve 77 so positioned, manipulation of the acceleration controls has the effect of simultaneously operating the engine throttle to increase engine power available and at the same time compressing the governor spring 180, resulting in a shift of the governor valve stem toward the left as viewed in FIG. 5B.

As the engine speed increases, the rotary input speed sensor rotates proportionally, and outward movement of the flyweights 219 moves the input speed sensor valve stem toward the left as viewed in FIG. 5B toward a position where the valve land 211 uncovers the charge port 217 and pressure is admitted through the reduced valve stem portion 216 leading to the shift qualifying valve 129 and the governor valve 80. The pressure thus delivered by the input speed sensor is proportional to the square of the engine speed as demonstrated by the speed sensor curve in FIG. 4. As the pressure rises around the reduced stem portion 212, a feedback signal is derived through the longitudinal passage 220 in the valve stem and applied to the left end of the valve stem in opposition to the flyweight signal, in a manner to limit the maximum pressure developed responsive to input speed to a value substantially less than the charge pressure available at the port 217. For example, where the charge pressure may be on the order of 300 psi, the pressure in the ports 215 and 216 attains a maximum value on the order of 130 psi.

As the pressure increases in the port 215, it ultimately acts on the left end of the valve stem in the pressure regulator valve 132, effecting movement of the latter toward the right where the valve land 260 uncovers the charge pressure port 264 so that regulated pressure may be delivered across the reduced stem portion 262 to the port 265. As demonstrated by the pressure regulator curve in FIG. 4, the enlarged left end of the piston 267 in the pressure regulator valve 132 enables shifting of the valve stem in a manner to attain maximum regulated pressure in the port 265 at about 70 per cent of rated engine speed, and the working pressure in the pressure conduit between the variable unit 23 and the fixed unit 35 follows a curve corresponding to the pressure regulator curve. Where the charge pressure available is on the order of 300 psi, the maximum regulated pressure in the port 265 is on the order of 245 psi. The maximum working pressure may be on the order of 6,000 psi. In order to control the regulated pressure in the port 265, a feedback signal is derived from the port 265 by means of the restricted orifice 272 leading to the chamber 271 at the right end of the valve stem in the pressure regulator valve 132.

Considering now the operation of the governor valve 80, the initial manual input signal has the effect of shifting the governor valve stem toward the left where regulated pressure in the port 192 is communicated across the reduced valve stem portion 176 to the port 194, and thence to the displacement varying chamber 118. Thus, on availability of regulated pressure in the port 192, the tendency would be to stroke the variable unit in the wrong direction, and in order to prevent such operation, the slot 380 on the piston rod 382 in the displacement varying means ports such initial signal to drain while the displacement varying piston 115 is in the vicinity of the neutral central position.

As the engine speed increases and engine speed responsive pressure becomes available at the port 216, such pressure is also delivered to the chamber 197 at the left end of the valve stem in the governor valve in a manner to urge the governor valve stem toward the right in opposition to the spring 180, to a position where the regulated pressure available in the port 192 is communicated across the reduced stem portion 176 to the control port 191. Now, the control pressure is delivered from the port 191 through the sequence valve 128 and the selector valve 77 to the displacement varying chamber 117 to effect movement of the variable cam 30 toward the position illustrated in FIG. 5B.

Delivery of control fluid to the port 191 also delivers control fluid under pressure to the top of the piston 207 in the charge relief valve 126. In this manner, the relief setting on the charge relief valve is increased in proportion to the increase in control pressure delivered to the displacement varying means, so that the pressure of charge fluid gradually increases as the control pressure and the working pressure increase.

At this time, charge pressure is available at the charge port 164 in the PTO control valve 78 and is delivered across the reduced stem portion 162 to the port 165 from whence it passes through sequence valve port 358, the reduced stem portion 339 and port 359 to pressurize the clutch cylinder 54 and thereby engage the clutch 53 for locking up the differential 19 in a manner such that the transmission is operated solely through the hydrostatic transmission 16. Control of transmission speed is controlled by varying the transmission ratio.

As long as the engine speed continues to increase, the pressure signal applied to the chamber 197 at the left end of the governor valve also increases, holding the governor valve in a position communicating the regulated pressure port 192 with the control port 191, and the control pressure continues to increase the transmission ratio (output speed relative to input speed) in a manner to load the engine to control its speed to attain a value directed by the setting of the accelerator control 75. When the engine becomes adequately loaded, through increased pump displacement, the engine speed increase is discontinued, so that the governor valve stem bias also decreases, and the valve stem moves back toward the neutral central position. At this position, the engine speed is held at the desired value.

Braking of the transmission is provided by actuation of acceleration and braking control 75 without actuating the engine throttle. Thus, on depression of the braking control, the manual pressure on the spring 180 is increased, shifting the valve stem toward the left to a position where control fluid is ported from the port 192 across the reduced valve stem portion 176 to the port 194 where it is delivered to the displacement varying chamber 118 which tends to reduce the stroke of the variable unit 23. At this time, since the engine power is reduced, the momentum of the vehicle tends to drive the fixed unit 35 as a pump so that the variable unit 23 functions as a motor. The unit 23 therefore imposes braking action on the motion of the vehicle by driving the engine. In the variable displacement unit 23, the fluid pressure moment acting on the variable cam 30 becomes a stroke-increasing force during motoring, in contrast to the stroke-reducing tendency during pumping, so that if the displacement of the variable unit is reduced too rapidly, and the pressure in the conduit from the unit 35 to the unit 23 becomes unduly high, the fluid pressure moment exerts a stroke-increasing effect which limits the rate of vehicle deceleration.

In order to operate the transmission reversely in the low range, the selector valve 77 is moved toward the left in FIG. 5B to a position where the valve land 143 blocks the port 159 and the valve land 142 blocks the port 156, while the reduced stem portion 147 communicates the port 154 with the port 155 leading to the displacement varying chamber 118. Now, if the accelerator control is operated to bring the engine up to speed and to actuate the governor valve 80, control pressure is delivered to the displacement varying chamber 118 to incline the swashplate 30 in the variable unit 23 in a reverse direction to cause transmission operation reversely in the low range in a manner corresponding to description of operation forwardly, as set forth above. With the valve stem in the selector valve 77 positioned for such reverse operation, the enlarged land portion 140 at the right end of the valve stem will be positioned to block the shift ports 153 and 152 so that shifting to the high range operation cannot occur.

In order to operate the transmission forwardly in a manner permitting automatic shifting to the high range for purposes of attaining maximum speed, the selector valve 77 is moved to the left from the position shown in FIG. 5B to a position where the enlarged land portion 141 opens the shift port 153 and the latter communicates with port 152 through the reduced stem portion 146. At the same time, the reduced stem portion 148 communicates the ports 155 and 156, and the reduced stem portion 149 communicates the ports 158 and 159.

Shifting of the transmission from the low range to the high range is effected automatically when the engine has attained sufficient speed to support high range operation and when the output speed corresponds to the input speed. The latter condition occurs when the variable angle cam 30 in the hydraulic unit 23 has been adjusted to full stroke in the direction illustrated in FIG. 5B. At this time, the clutch elements in the high range clutch 55 are rotating synchronously so that clutching may be effected under full power.

In order to bring the engine and transmission up to the place where shifting occurs, the accelerator control 75 is manually actuated as described hereinabove in a manner to increase the engine speed and to initiate stroking of the variable hydraulic unit 23. In order to obtain the desired engine speed signal for automatic shifting, the shift qualifying valve 129 (FIG. 5A) responds to the engine speed pressure signal delivered to the port 216 in the input speed sensor valve 131. Thus, when the input speed sensor delivers sufficient pressure to the port 216, the fluid under pressure in the chamber 240 at the right end of shift qualifying valve 129 effects movement of the valve stem toward the left to a position where the reduced stem portion 232 communicates the charge pressure port 238 with the port 237. At that time, charge fluid is delivered to the port 153 in the selector valve 77 across the reduced stem portion 146 and to the port 152, from whence pressure is supplied to the port 315 at the left end of the enlarged piston 304 on the shift valve. However, shifting will not occur until the output speed reaches the input speed and the elements in the high range clutch 55 are rotating synchronously.

In order to determine when the output speed attains a value corresponding to the input speed, a signal is provided by the synchronous speed sensor 61 and the associated valving 125. In this connection, it should be understood that the valving 125 is diagrammatically illustrated in FIG. 5A, and comprises rotary valving at the ports 290 and 291.

In the synchronous speed sensor 61, an outer rotatable member 390 carries the valve housing or casing and rotates proportional to the transmission input speed while an inner shaft 391 rotates proportional to the transmission output shaft. Between the outer and inner concentric members 390 and 391, an intermediate ring 392 carries the valve stem actuator 288 and inwardly directed projections as at 393 engaging brake shoes 394 surrounding the shaft 391. Attached to the projections 393 are bowed leaf spring members 395 which yieldably urge the brake shoes 394 into frictional contact with the shaft 391. In operation, the brake shoes 394, the projections 393, and the intermediate ring 392, tend to follow the inner shaft 391 which rotates proportional to output speed. Thus, with the members 390 and 391 rotating in a counterclockwise direction as illustrated by the arrows, and with the output driven member 391 rotating slower than the input driven member 390, the valve actuator 288 tends to lag and maintain the valve stem 282 in the left position illustrated in FIG. 5A. When the output speed slightly exceeds the input speed, the output driven member 391 moves forwardly in a counterclockwise direction relative to the input driven member 390 and the valve stem 282 is shifted toward the right.

With the valve stem 282 and the synchronous speed sensor valve 125 in the leftmost position as illustrated in FIG. 5A, the reduced stem portion 284 communicates with charge port 290, and the reduced stem portion 285 communicates with port 291. Thus, the longitudinal passage 286 through the stem delivers fluid under pressure to the right end of the enlarged piston 301 on the stem of the shift valve 126, maintaining the latter in the leftmost position illustrated in FIG. 5A.

When the valve stem 282 in the synchronous speed sensor valve 125 is shifted toward the right, indicating the output speed has equaled the input speed, charge pressure is no longer communicated from the port 290 to the port 291 and pressure fluid is no longer supplied to the port 312 at the right end of the shift valve to maintain the shift valve in the leftmost position. Thus, assuming the engine has attained sufficient speed that the shift qualifying valve 129 is shifted to the left, and a shift signal has been supplied to the port 153 in the selector valve 77, and thence to the left end of the shift valve piston 304, the stem in the shift valve will be shifted to the right for purposes of shifting the transmission into the high range. The shift of the transmission to the high range requires pressurization of the high range clutch 55, depressurization of the low range clutch 53 and reversal of the movement of the variable cam 30 in the hydraulic unit 23.

The first effect of shifting of the valve stem and the shift valve is to move the enlarged land 302 to the right of the restricted port 322 so that the latter communicates across the reduced stem portion 307 to the port 324. Now, charge fluid is delivered from the PTO control valve 78 to the port 324, and thence to the port 355 in the sequence valve 128, which communicates across the reduced stem portion 338 with port 356. Fluid under pressure in the port 356 is supplied to the cylinder 56 in the high range clutch 55 for purposes of engaging the latter. At the same time, a fluid pressure bias is supplied to the port 202 in the governor valve 80 to shift the sleeve 199 to apply a predetermined bias to the governor valve so that in the event the accelerator control is released entirely, there will be a minimum engine speed setting above idle.

Fluid under pressure in the port 355 in the sequence valve is also delivered to the right end of the enlarged piston 331 on the sequence valve stem. Similarly, fluid under pressure in the port 356 is delivered to the port 353 at the right end of the reduced terminus of the sequence valve stem. After the clutch 55 is actuated, the two pressure signals at the right end of the sequence valve effect shifting of the valve stem toward the left. At this time, the port 350 at the left end of the piston 336 on the sequence valve stem is ported to drain through the shift valve port 321, the reduced stem portion 306 and the tank port 320.

Shifting of the sequence valve stem to the left moves the valve land 332 to a position blocking the port 358 so that charge pressure is no longer delivered to the right end of the shift valve terminus 310. At the same time, the port 359 is communicated across the reduced stem portion 339 to the port 360 now connected to drain. In this manner, the cylinder 54 in the low range clutch 53 is depressurized and the clutch is disengaged.

Shifting of the sequence valve stem also moves the valve lands 334 and 335 to the left where the land 334 blocks the port 361 leading to displacement varying chamber 117 and the reduced stem portion 340 communicates the control pressure port 362 with port 363 leading to the displacement varying chamber 118. Now the variable cam in the hydraulic unit 23 moves back toward zero stroke, so that the hydrostatic transmission subtracts less and less from the mechanical differential and the speed of the output shaft increases. Ultimately, the variable cam moves over center in the negative direction and the hydrostatic transmission adds more and more speed to the mechanical differential, as explained hereinabove.

When the sequence valve stem shifts to the left, and the piston portion 331 blocks the port 355, charge pressure is supplied to the port 356 through the reduced stem portion 338 and the charge port 358.

When the transmission is operating in the high range and it is desired to reduce vehicle speed to the place where the transmission shifts back down into the low range, it is necessary to move the stem in the shift valve 126 back toward the leftmost position illustrated in FIG. 5A. In order to do so, the left end of the valve stem piston 304 is ported to drain through the port 152 in the selector valve 77, the reduced stem portion 146 and the port 153 which communicates with the shift qualifying valve port 237. In order to obtain shift from the low range to the high range, it will be recalled that the stem in the shift qualifying valve 129 had been shifted to the left to a position where the land portion 230 blocks the drain port 236. Thus, after shifting into high range, it is necessary to return the stem in the shift qualifying valve to the rightmost position illustrated in FIG. 5A, so that the port 237 communicates across the reduced stem portion 232 with the drain port 236 and the stem in the shift valve 126 may be again moved toward the left.

In order to move the stem in the shift qualifying valve 129 toward the right, fluid under pressure is delivered thereto through the reshift delay valve 130. In particular, when the high range clutch 55 is pressurized, fluid under pressure is also delivered through the restricted orifice 255 to the reshift delay valve. After an appropriate delay period, the valve member 250 is moved toward the right from the position illustrated in FIG. 5A to a position where the port 252 communicates with port 253 to reset the shift qualifying valve. The delay in permitting a shift in the transmission back downwardly eliminates response to transitory reshift signals which may occur during the shifting from low to high and do not actually require reshift to the low range.

We claim:

1. A hydrostatic transmission comprising,
   a. an input shaft,
   b. an output shaft,
   c. a first hydraulic unit connected to the input shaft,
   d. a second hydraulic unit connected to the output shaft,
   e. conduit means interconnecting the hydraulic units for delivering fluid under pressure from one to the other and returning fluid from the other to the one,
   f. an engine for driving the input shaft including a throttle for controlling engine power,
   g. fluid operable means for varying the displacement of one of the hydraulic units to vary the speed of the output shaft relative to the speed of the input shaft,
   h. a governor valve for controlling the flow of control fluid relative to the displacement varying means to control displacement,
   i. acceleration control means for applying a predetermined resilient bias to the governor valve and simultaneously establishing an engine throttle setting to provide a predetermined engine speed, and
   j. means responsive to the speed of the engine and providing a fluid pressure signal proportional to engine speed to the governor valve in opposition to the manual bias for establishing a transmission ratio for controlling engine speed, comprising a valve having
      1. an inlet communicating with a source of charge fluid under pressure,
      2. an outlet for supplying said fluid pressure signal to the governor valve and
      3. a valve member controlling communication between the inlet and outlet and responsive to the speed of the engine for supplying bias fluid under pressure to the valve outlet proportional to the square of engine speed.

2. A hydrostatic transmission comprising,
   a. an input shaft,
   b. an output shaft,
   c. a first hydraulic unit connected to the input shaft,
   d. a second hydraulic unit connected to the output shaft,
   e. conduit means interconnecting the hydraulic units for delivering fluid under pressure from one to the other and returning fluid from the other to the one,
   f. an engine for driving the input shaft including a throttle for controlling engine power,
   g. fluid operable means for varying the displacement of one of the hydraulic units to vary the speed of the output shaft relative to the speed of the input shaft,
   h. a governor valve for controlling the flow of control fluid relative to the displacement varying means to control displacement,
   i. acceleration control means for applying a predetermined resilient bias to the governor valve and simultaneously establishing an engine throttle setting to provide a predetermined engine speed,
   j. means responsive to the speed of the engine and providing a fluid pressure signal proportional to engine speed to the governor valve in opposition to the manual bias for establishing a transmission ratio for controlling engine speed,
   k. a pressure regulating valve for supplying control fluid under pressure to the governor valve,
   l. said engine speed responsive means providing a fluid pressure signal to the pressure regulating valve for establishing maximum control fluid pressure at a predetermined engine speed.

3. A transmission as defined in claim 1, including a pressure regulating valve having an inlet communicating with a source of charge fluid under pressure, an outlet for supplying control fluid to the governor valve, a valve member controlling communication between the inlet and outlet, means biasing the valve member toward a position blocking communication between the inlet and outlet, and means supplying fluid under pressure from the engine speed responsive valve outlet to bias the pressure regulating valve member in a valve opening direction to establish maximum control fluid pressure at less than maximum engine speed.

4. A transmission as defined in claim 1, wherein the engine speed responsive valve includes means for constantly biasing the valve member in a direction to block communication between the valve inlet and the valve outlet, means responsive to the speed of the engine for biasing the valve member in a direction to communicate the valve inlet and valve outlet, and means providing a feedback signal when the valve is open to aid the constant bias for limiting maximum pressure at the valve outlet.

5. A hydrostatic transmission, comprising,
  a. an input shaft,
  b. an output shaft,
  c. a first hydraulic unit connected to the input shaft,
  d. a second hydraulic unit connected to the output shaft,
  e. conduit means interconnecting the hydraulic units for delivering fluid under pressure from one to the other and returning fluid from the other to the one,
  f. an engine for driving the input shaft including a throttle for controlling engine power,
  g. fluid operable means for varying the displacement of one of the hydraulic units to vary the speed of the output shaft relative to the speed of the input shaft,
  h. a governor valve for controlling the flow of control fluid relative to the displacement varying means to control displacement,
  i. acceleration control means for applying a predetermined resilient bias to the governor valve and simultaneously establishing an engine throttle setting to provide a predetermined engine speed,
  j. means providing a bias signal proportional to engine speed to the governor valve in opposition to the manual bias for establishing a transmission ratio for controlling engine speed,
  k. a pressure regulating valve for supplying control fluid to the governor valve, and
  l. means providing a signal proportional to engine speed to the pressure regulating valve for establishing maximum control fluid pressure at less than full engine speed.

6. A transmission as defined in claim 5, wherein the pressure regulating valve includes an inlet communicating with a source of charge fluid under pressure, an outlet for supplying control fluid to the governor valve, a valve member controlling communication between the inlet and outlet, and means biasing the valve member toward a position blocking communication between the inlet and outlet, and said signal providing means is responsive to engine speed for supplying fluid under pressure to the pressure regulating valve in a valve opening direction to establish maximum control fluid pressure at less than rated engine speed.

7. A transmission as defined in claim 6, including means providing a feedback signal from a pressure regulating valve outlet to aid the valve closing bias to limit maximum control pressure.

8. A transmission as defined in claim 6, including a charge pump for supplying charge fluid under pressure to the pressure regulating valve inlet, a charge relief valve controlling charge pressure, means for supplying a pressure signal from the governor valve to increase the relief setting in the charge relief valve with the increase in control pressure delivered to the displacement varying means.

9. A transmission as defined in claim 6, wherein the engine speed responsive means comprises a valve having an inlet communicating with a source of charge fluid under pressure, an outlet adapted to supply valve opening fluid under pressure to the pressure regulating valve, and a valve member controlling communication between the inlet and outlet and responsive to the speed of the engine for supplying valve opening fluid under pressure to the pressure regulating valve proportional to the square of engine speed.

10. A transmission as defined in claim 9, including a charge pump for supplying charge fluid to the inlet of the pressure regulating valve, a charge relief valve for controlling charge fluid pressure, and means for supplying a signal to the charge relief valve to increase the relief valve setting as the governor valve delivers control fluid to the displacement varying means, so that on accelerating the vehicle the charge pressure, the control pressure and the working pressure tend to increase together as the engine speed and transmission ratio increase.

11. A hydrostatic transmission, comprising,
  a. an input shaft,
  b. an output shaft,
  c. a first hydraulic unit connected to the input shaft,
  d. a second hydraulic unit connected to the output shaft,
  e. conduits interconnecting the hydraulic units for delivering fluid under working pressure from one to the other and returning fluid from the other to the one,
  f. an engine for driving the input shaft including a throttle for controlling engine power,
  g. fluid operable means for varying the displacement of one of the hydraulic units to vary the speed of the output shaft relative to the speed of the input shaft,
  h. a governor valve for controlling the flow of control fluid relative to the displacement varying means to control displacement,
  i. acceleration control means for applying a predetermined resilient bias to the governor valve and simultaneously establishing an engine throttle setting to provide a predetermined engine speed,
  j. means providing a bias signal proportional to engine speed to the governor valve in opposition to the manual bias for establishing a transmission ratio for controlling engine speed,
  k. first conduit means for supplying control fluid from the governor valve to adjust the displacement varying means to increase transmission ratio responsive to the engine speed signal,
  l. second conduit means for supplying control fluid from the governor valve to adjust the displacement varying means to reduce transmission ratio responsive to the manual acceleration signal, and m. means for porting the initial manual signal to drain when the displacement varying means is near zero displacement to prevent negative transmission operation responsive to the initial manual signal before the engine attains speed.

12. A transmission as defined in claim 11 wherein the displacement varying means includes a cylinder having a piston reciprocable therein and a rod connecting the piston to vary displacement, and the drain port comprises a groove on the piston rod communicating with the second conduit means and with drain when the piston is near zero displacement.

13. A hydrostatic transmission, comprising,
a. an input shaft,
b. an output shaft,
c. a first hydraulic unit connected to the input shaft,
d. a second hydraulic unit connected to the output shaft,
e. conduit means interconnecting the hydraulic units for delivering fluid under pressure from one to the other and returning fluid from the other to the one,
f. an engine for driving the input shaft including a throttle for controlling engine power,
g. fluid operable means for varying the displacement of one of the hydraulic units to vary the speed of the output shaft relative to the speed of the input shaft,
h. a governor valve for controlling the flow of control fluid relative to the displacement varying means to control displacement,
i. control means for applying a predetermined resilient bias to the governor valve,
j. means providing a bias signal proportional to signal speed to the governor valve in opposition to the manual bias for establishing a transmission ratio for controlling engine speed,
k. an acceleration control for actuating said governor valve control means and simultaneously establishing an engine throttle setting to provide a predetermined engine speed, and
l. a braking control for actuating said governor valve control means without actuating the engine throttle.

14. A transmission as defined in claim 13, wherein said governor valve control means includes a spring acting on the governor valve, a plunger engaging the spring for establishing a predetermined spring setting, and a mechanical linkage connected for operating by the acceleration control and by the braking control.

15. A transmission as defined in claim 14, wherein the acceleration control comprises a manually operable pedal for simultaneously actuating said mechanical linkage and said engine throttle, and the braking control comprises a manually operable pedal for actuating the mechanical linkage without actuating the throttle.

16. A hydrostatic transmission, comprising,
a. an input shaft,
b. an output shaft,
c. a first hydraulic unit connected to the input shaft,
d. a second hydraulic unit connected to the output shaft,
e. conduits interconnecting the hydraulic units for delivering fluid under working pressure from one to the other and returning fluid from the other to the one,
f. an engine for driving the input shaft including a throttle for controlling engine power,
g. fluid operable means for varying the displacement of the first hydraulic unit to vary the speed of the output shaft relative to the speed of the input shaft,
h. a governor valve for controlling the flow of control fluid relative to the displacement varying means to control displacement,
i. acceleration control means for applying a predetermined resilient bias to the governor valve and simultaneously establishing an engine throttle setting to provide a predetermined engine speed,
j. means providing a bias signal proportional to engine speed to the governor valve in opposition to the manual bias for establishing a transmission ratio for controlling engine speed,
k. shunt valve means for connecting opposite sides of the displacement varying means,
l. means normally biasing the shunt valve means to closed position blocking communication between opposite sides of the displacement varying means, and
m. means responsive to excessive control pressure created by the displacement varying means on panic stops when the second hydraulic unit is locked, for actuating the shunt valve means to connect opposite sides of the displacement varying means.

17. A transmission as defined in claim 16, including means mounting the displacement varying means subject to a stroke-reducing working pressure fluid moment.

18. A hydrostatic transmission, comprising,
a. an input shaft,
b. an output shaft,
c. a first hydraulic unit connected to the input shaft,
d. a second hydraulic unit connected to the output shaft,
e. conduits interconnecting the hydraulic units for delivering fluid under working pressure from one to the other and returning fluid from the other to the one,
f. an engine for driving the input shaft including a throttle for controlling engine power,
g. fluid operable means for varying the displacement of the first hydraulic unit to vary the speed of the output shaft relative to the speed of the input shaft,
h. a governor valve for controlling the flow of control fluid relative to the displacement varying means to control displacement,
i. acceleration control means for applying a predetermined resilient bias to the governor valve and simultaneously establishing an engine throttle setting to provide a predetermined engine speed,
j. means providing a bias signal proportional to engine speed to the governor valve in opposition to the manual bias for establishing a transmission ratio for controlling engine speed,
k. first conduit means for supplying control fluid from the governor valve to adjust the displacement varying means to increase transmission ratio responsive to the engine speed signal, l. second conduit means for supplying control fluid from the governor valve to adjust the displacement varying means to reduce transmission ratio responsive to the manual acceleration signal, m. means mounting the displacement varying means subject to a stroke-reducing working pressure fluid moment, n. shunt valve means for connecting said first and second conduit means, o. means normally biasing the shunt valve means to closed position blocking communication between said first and second conduit means, and p. means responsive to excessive control pressure created by the displacement varying means on panic stops when the second hydraulic unit is locked, for actuating the shunt valve means to connect said first and second conduit means.

19. A transmission as defined in claim 18, including a pressure regulating valve responsive to engine speed for supplying control fluid under pressure to the governor valve and supplying fluid biasing said shunt valve means toward closed position under pressure proportional to engine speed.

20. A transmission as defined in claim 5, including means mounting the displacement varying means subject to the stroke-controlling working-pressure-fluid moment.

21. A transmission as defined in claim 20, including a charge pump for supplying charge fluid under pressure to the pressure regulating valve for delivery of control fluid to the governor valve, a charge relief valve controlling charge pressure, means for supplying a pressure signal from the governor valve to increase the relief setting of the charge relief valve with increase in control pressure delivered to the displacement varying means, so that the charge pressure, the control pressure limit and the working pressure limit are increased together as the engine speed and the transmission ratio increase.

22. A drive, comprising,
a. a hydrostatic transmission including first and second hydraulic units connected in closed hydraulic circuit,
b. an input shaft driving the hydrostatic transmission,
c. an output shaft driven by the hydrostatic transmission,
d. an engine for driving the input shaft,
e. fuel control means for establishing an engine horsepower setting,
f. means for varying the displacement of one of the hydraulic units to vary the transmission ratio
g. a displacement control valve for controlling the displacement varying means,
h. means for sensing the engine horsepower setting and applying a first predetermined bias to the displacement control valve proportional to the engine horsepower setting, and
i. means responsive to the speed of the engine for applying a second predetermined bias to the displacement control valve proportional to engine speed in opposition to the first bias.

23. A drive as defined in claim 22, including a spring acting on the ratio control valve, a plunger engaging the spring, and mechanical linkage connected for operation by the fuel supply means for actuating the plunger to establish a spring setting proportional to engine horsepower.

24. A drive as defined in claim 22, wherein the last recited means comprises a valve responsive to engine speed for supplying a fluid pressure signal to the ratio control valve proportional to engine speed.

25. A drive, comprising,
a. an input shaft,
b. an output shaft,
c. a first hydraulic unit connected to the input shaft,
d. a second hydraulic unit connected to the output shaft,
e. conduit means interconnecting the hydraulic units for delivering fluid under pressure from one to the other and returning fluid from the other to the one,
f. an engine for driving the input shaft including fuel supply means for controlling engine power,
g. fluid operable means for varying the displacement of one of the hydraulic units to vary the speed of the output shaft relative to the speed of the input shaft,
h. a governor valve for controlling the flow of control fluid relative to the displacement varying means to control displacement,
i. means for applying a first predetermined bias to the governor valve proportional to engine power, and
j. means responsive to the speed of the engine and providing a fluid pressure signal proportional to engine speed to the governor valve in opposition to the first bias for establishing a transmission ratio for controlling engine speed.

* * * * *